US012608838B2

(12) United States Patent
Lee

(10) Patent No.: US 12,608,838 B2
(45) Date of Patent: Apr. 21, 2026

(54) DEVICE AND METHOD FOR TRACKING AN OBJECT

(71) Applicants: HYUNDAI MOTOR COMPANY, Seoul (KR); KIA CORPORATION, Seoul (KR)

(72) Inventor: Se Jeong Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 417 days.

(21) Appl. No.: 17/970,140

(22) Filed: Oct. 20, 2022

(65) Prior Publication Data

US 2023/0334692 A1     Oct. 19, 2023

(30) Foreign Application Priority Data

Apr. 13, 2022     (KR) ........................ 10-2022-0045849

(51) Int. Cl.
*G06T 7/73* (2017.01)
*G06V 10/764* (2022.01)
*G06V 20/58* (2022.01)

(52) U.S. Cl.
CPC .............. *G06T 7/73* (2017.01); *G06V 10/764* (2022.01); *G06V 20/58* (2022.01); *G06T 2207/30252* (2013.01)

(58) Field of Classification Search
CPC ... G06T 7/73; G06T 7/20; G06T 2207/10016; G06T 2207/30256; G06T 2207/30252; G06T 2207/10024; G06T 2207/20084; G06T 2207/10028; G06V 20/58; G06V 20/588; G06V 10/764
See application file for complete search history.

(56) References Cited

U.S. PATENT DOCUMENTS

2020/0380274 A1* 12/2020 Shin .......................... G06T 1/20
2021/0042592 A1* 2/2021 Hashimoto .......... G06V 10/764

FOREIGN PATENT DOCUMENTS

CN 114169241 A * 3/2022 ............. G06F 30/27
KR 20190125702 A 11/2019
KR 20200023221 A 3/2020
KR 20210041213 A 4/2021

OTHER PUBLICATIONS

Chen L. A Merge/Split Algorithm for Multitarget Tracking Using Generalized Labeled Multi-Bernoulli Filters. arXiv preprint arXiv: 1908.01743v3. Aug. 8, 2021. (Year: 2021).*

* cited by examiner

*Primary Examiner* — Tracy Mangialaschi
(74) *Attorney, Agent, or Firm* — Lempia Summerfield Katz LLC

(57) ABSTRACT

A device and a method for tracking an object are disclosed. The device includes a camera for acquiring an external environment image of a vehicle and a controller. The controller extracts a detected object from the external environment image, generates an estimated object by predicting a next position of the detected object, assigns an ID to the detected object based on an intersection over union (IOU) between the estimated object and the detected object, assigns a weight based on a detection frequency of each of the IDs, and generates the estimated object based on the weight.

18 Claims, 16 Drawing Sheets ob               ob $$IoU = \frac{Overlapping\ Region}{Combined\ Region}$$

TRACKED OBJECT: W1 → W2, W1 < W2

TRACKED OBJECT: INCREASE Q1
WITHIN ROI REGION: MAINTAIN Q1

DEVICE AND METHOD FOR TRACKING AN OBJECT

CROSS-REFERENCE TO RELATED APPLICATION

This application claims the benefit of priority to Korean Patent Application No. 10-2022-0045849, filed in the Korean Intellectual Property Office on Apr. 13, 2022, the entire contents of which are incorporated herein by reference.

TECHNICAL FIELD

The present disclosure relates to a device and a method for tracking an object, and more particularly, to a technology capable of more accurately tracking the object.

BACKGROUND

A vehicle may be classified into an internal combustion engine vehicle, an external combustion engine vehicle, a gas turbine vehicle, an electric vehicle, or the like depending on a type of a motor used.

An autonomous vehicle refers to a vehicle that may operate by itself without manipulation of a driver or a passenger, and automated vehicle & highway systems refer to systems that monitor and control such autonomous vehicle to operate by itself.

In addition to the autonomous vehicle, technologies for monitoring an external environment of the vehicle for assisting driving of the driver and operating various driving assistance means based on the monitored vehicle external environment are being proposed.

As means for monitoring the external environment of the vehicle, various techniques for detecting an object in an external environment image and tracking the detected object have been proposed. Typically, a method for tracking the object based on a Kalman filter is used. In the conventional object tracking technology, an interval at which an image input is received may not be constant, or the object being tracked may not be recognized and thus a performance of tracking the object may be deteriorated.

SUMMARY

The present disclosure has been made to solve the above-mentioned problems occurring in the prior art while advantages achieved by the prior art are maintained intact.

An aspect of the present disclosure provides a device and a method for tracking an object that may improve a performance of tracking the object.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a device for tracking an object includes a camera for acquiring an external environment image of a vehicle and a controller that extracts a detected object from the external environment image. The controller also generates an estimated object by predicting a next position of the detected object and assigns an ID to the detected object based on an intersection over union (IOU) between the estimated object and the detected object. The controller also assigns a weight based on a number of times of each of the IDs and generates the estimated object based on the weight.

In one implementation, the controller may acquire a front image of the vehicle and may convert the front image into a top view image.

In one implementation, the controller may classify the detected object as a tracked object based on the IOU exceeding a preset threshold value and may assign the ID to the tracked object to inherit an ID of a tracking target object.

In one implementation, the controller may increase the weight for the tracked object.

In one implementation, the controller may classify the detected object as a new object based on the IOU higher than 0 and equal to or lower than a preset threshold value and may assign a new ID to the new object.

In one implementation, the controller may increase the weight for the new object.

In one implementation, the controller may classify the detected object as an unrecognized object based on the IOU being 0 and may assign the ID to the unrecognized object to inherit an ID of a tracking target object.

In one implementation, the controller may calculate a quality index for the process of generating the estimated object based on the weight and a detected position of the detected object.

In one implementation, the controller may increase the quality index as the weight increases.

In one implementation, the controller may reduce the quality index when the detected object is out of a region of interest.

According to another aspect of the present disclosure, a method for tracking an object includes: extracting a detected object from an image; generating an estimated object by predicting a next position of the detected object; assigning an ID to the detected object based on an intersection over union (IOU) between the estimated object and the detected object; assigning a weight based on a number of times of each of the IDs; and generating the estimated object based on the weight.

In one implementation, the extracting of the detected object may include acquiring a front image of a vehicle, converting the front image into a top view image, and extracting the detected object from the top view image.

In one implementation, the assigning of the ID to the detected object may include classifying the detected object as a tracked object based on the IOU exceeding a preset threshold value and may include assigning the ID to the tracked object to inherit an ID of a tracking target object.

In one implementation, the assigning of the weight may include increasing the weight for the tracked object.

In one implementation, the assigning of the ID to the detected object may include classifying the detected object as a new object based on the IOU higher than 0 and equal to or lower than a preset threshold value and may include assigning a new ID to the new object.

In one implementation, the assigning of the weight may include increasing the weight for the new object.

In one implementation, the assigning of the ID to the detected object may include classifying the detected object as an unrecognized object based on the IOU being 0 and may include assigning the ID to the unrecognized object to inherit an ID of a tracking target object.

In one implementation, the method may further include calculating a quality index for the process of generating the estimated object based on the weight and a detected position of the detected object.

In one implementation, the calculating of the quality index may include increasing the quality index as the weight increases.

In one implementation, the calculating of the quality index may include reducing the quality index when the detected object is out of a region of interest.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
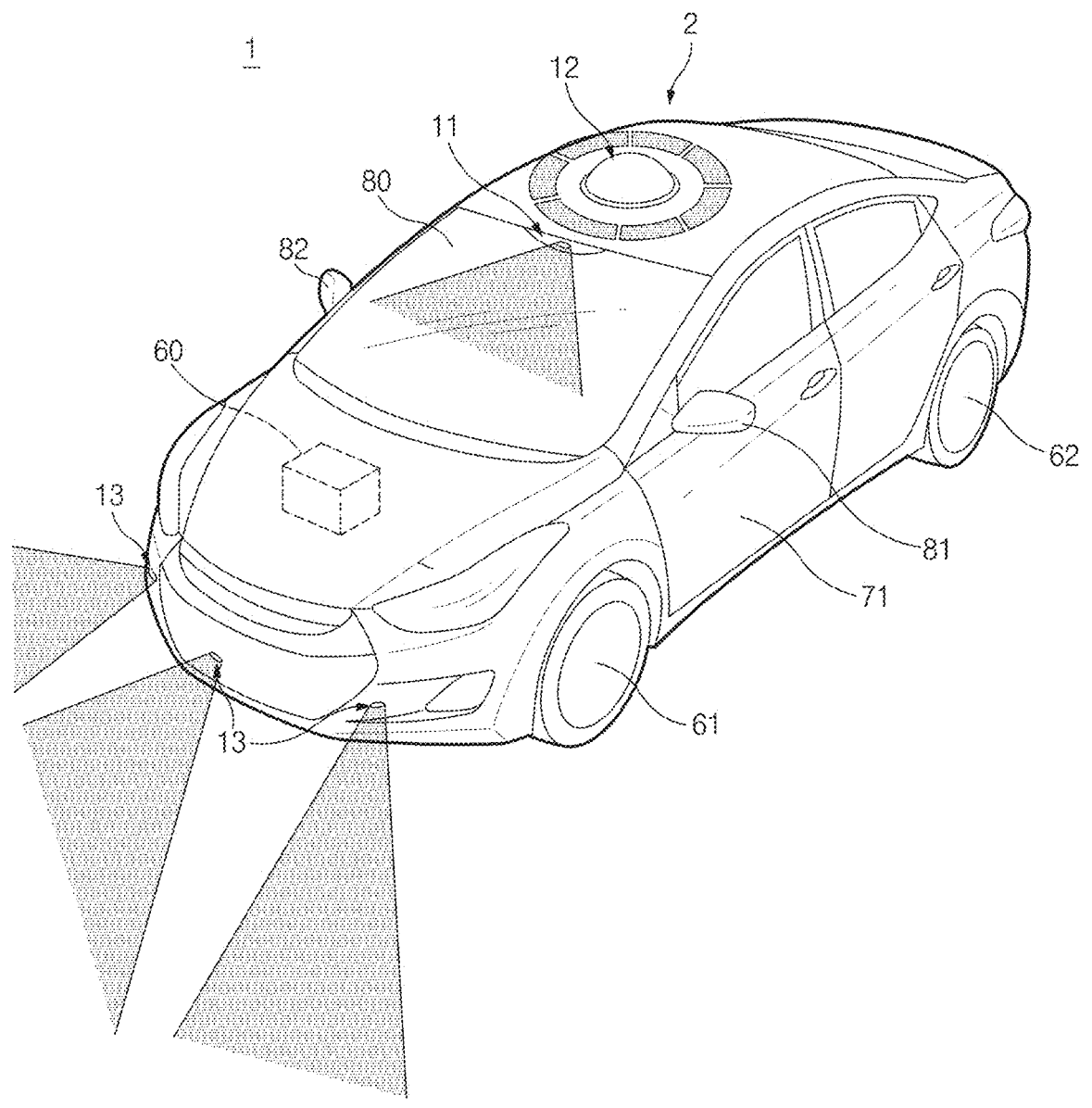
FIG. 1 is a view showing a vehicle including an object tracking device in one embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art. Such terms should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-16.

FIG. 1 is a view showing a vehicle including an object tracking device in one embodiment of the present disclosure.

Referring to FIG. 1, a vehicle 1 according to an embodiment of the present disclosure may include a main body 2 that forms an appearance of the vehicle 1, wheels 61 and 62 that move the vehicle 1, and a driving device 60 that rotates the wheels 61 and 62. The vehicle 1 also may include a door 71 that shields an interior of the vehicle 1 from an exterior of the vehicle 1, a windshield 80 that provides a front view of the vehicle 1 to a user inside the vehicle 1, and side mirrors 81 and 82 that provide side and rear views of the vehicle 1 to the user.

The wheels 61 and 62 may include the front wheel 61 disposed at a front portion of the vehicle and the rear wheel 62 disposed at a rear portion of the vehicle. The driving device 60 may provide a rotational force to the front wheel 61 or the rear wheel 62 such that the main body 2 moves forward or rearward.

The door 71 may be pivotably disposed at each of left and right sides of the main body 2. An occupant may board the vehicle 1 when the door 71 is opened and the interior of the vehicle 1 may be shielded from the exterior of the vehicle 1 when the door 71 is closed.

The windshield 80, which is a kind of windscreen, may be disposed at a front upper side of the main body 2 to provide information about the front view of the vehicle 1 to a driver or the user inside the vehicle 1.

The side mirrors 81 and 82 may include the left side mirror 81 disposed at the left side of the main body 2 and the right side mirror 82 disposed at the right side of the main body 2 and may provide information about the side and rear views of the vehicle 1 to the driver inside the vehicle 1.

The vehicle 1 may be an electrification-based vehicle, such as an electric vehicle (EV), a hybrid electric vehicle (HEV), a plug-in hybrid electric vehicle (PHEV), a fuel cell electric vehicle (FCEV), and the like. In a case of the electrification-based vehicle, the driving device 60 may be a driving motor.

Figure 2:
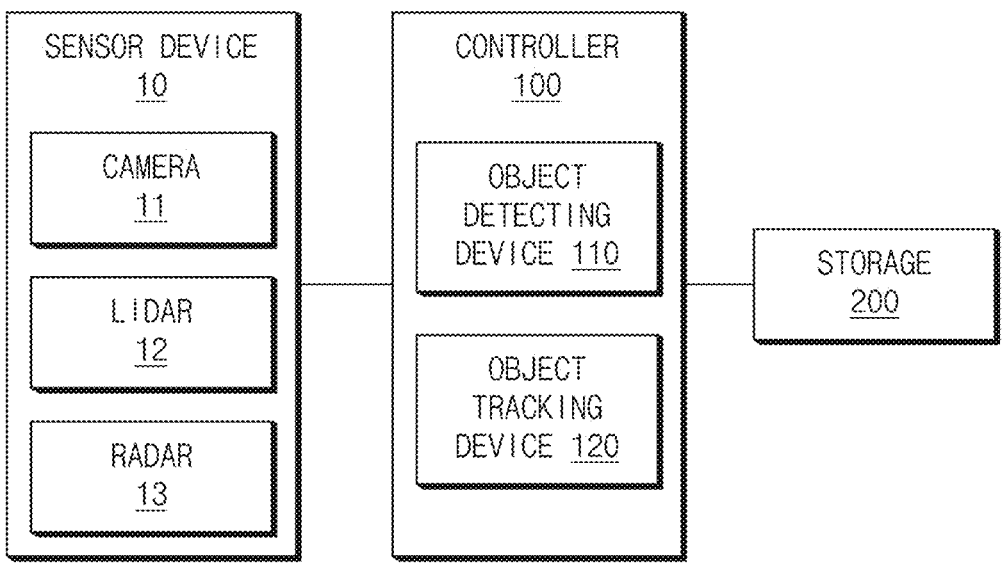
FIG. 2 is a block diagram showing an object tracking device according to an embodiment of the present disclosure.

FIG. 2 is a block diagram showing an object tracking device according to an embodiment of the present disclosure.

Referring to FIG. 2, an object tracking device according to an embodiment of the present disclosure may include a sensor device 10 and a controller 100.

The sensor device 10 is for acquiring sensing data for extracting objects around the vehicle. The sensor device 10 may include a camera 11, a LIDAR 12, a Radar 13, and the like. Positions where the camera 11, the LIDAR 12, and the Radar 13 are formed may not be limited to those in FIG. 1.

The camera 11 may acquire image data based on sensing of light in a visible region from a region in front of the vehicle.

The LIDAR 12 may determine the object by transmitting a laser pulse and measuring a time at which the transmitted laser pulse is reflected. The LIDAR 12 may provide three-dimensional information.

The Radar 13 may analyze the object by transmitting an electromagnetic wave and analyzing the returned electromagnetic wave. The Radar 13 may provide two-dimensional information and may provide information about the object quickly.

The controller 100 may extract the object based on the sensing data acquired by the sensor device 10 and track the extracted object. Hereinafter, an embodiment of the present disclosure is described mainly based on the extracting of the object based on the image data acquired by the camera and tracking of the object.

The controller 100 may include an object detecting device 110 for extracting the object and an object tracking device 120 for tracking the extracted object.

The object detecting device 110 may extract a detected object from an external environment image. The object detecting device 110 according to an embodiment may convert a front image into a top view image and extract the detected object from the converted top view image.

The object tracking device 120 may generate an estimated object by predicting a next position of the detected object. The object tracking device 120 may assign an ID to the detected object based on intersection over unions (IOUs) of the estimated object and the detected object. The object tracking device 120 may assign a weight based on a number of times of each ID and generate the estimated object based on the weight.

Storage 200 may store an object detection algorithm for the object detection and an object tracking algorithm for the object tracking.

At least one of the object detection algorithm and/or the object tracking algorithm may be performed based on artificial intelligence. To this end, the controller 100 may include an artificial intelligence (AI) processor. The AI processor may learn a neural network using a pre-stored program. The neural network may be designed to simulate a human brain structure on a computer and may include a plurality of network nodes having weights that simulate neurons of a human neural network. The plurality of network nodes may transmit and receive data based on connection relationships therebetween so as to simulate a synaptic activity of a neuron in which the neuron transmits and receives a signal via a synapse. The neural network may include a deep learning model developed from a neural network model. In the deep learning model, the plurality of network nodes may transmit and receive the data based on convolutional connection relationships thereof while being located in different layers. Examples of the neural network model may include various deep learning techniques such as deep neural networks (DNN), convolutional deep neural networks (CNN), a recurrent neural network (RNN), a restricted Boltzmann machine (RBM), deep belief networks (DBN), a deep Q-network, and the like.

The storage 200 may be disposed in the controller 100 and may be a separate memory. Therefore, the storage 200 may be composed of a combination of a non-volatile memory and/or a volatile memory. The non-volatile memory may be a hard disk drive, a flash memory, an electrically erasable programmable read-only memory (EEPROM), a ferro-electric RAM (FRAM), a phase-change RAM (PRAM), a magnetic RAM (MRAM), and the like. The volatile memory may be a static RAM (SRAM), a dynamic random access memory (DRAM), a synchronous dynamic random access memory (SDRAM), a double date rate-SDRAM (DDR-SDRAM), and the like.

Figure 3:
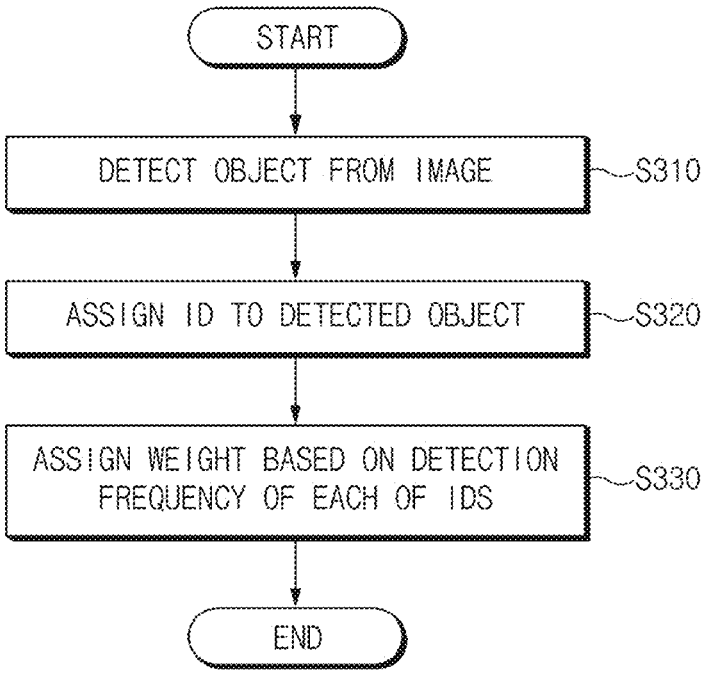
FIG. 3 is a flowchart illustrating an object tracking method according to an embodiment of the present disclosure.

FIG. 3 is a flowchart illustrating an object tracking method according to an embodiment of the present disclosure.

Referring to FIG. 3, the object tracking method according to an embodiment of the present disclosure is as follows.

In S310, the object detecting device 110 of the controller 100 may detect the object from the image.

The object detecting device 110 may detect the object from the image acquired by the camera 11. To this end, the object detecting device 110 may convert the front image in a form of a fisheye view acquired by the camera 11 into the top view image, as shown in FIG. 4.

Figure 4:
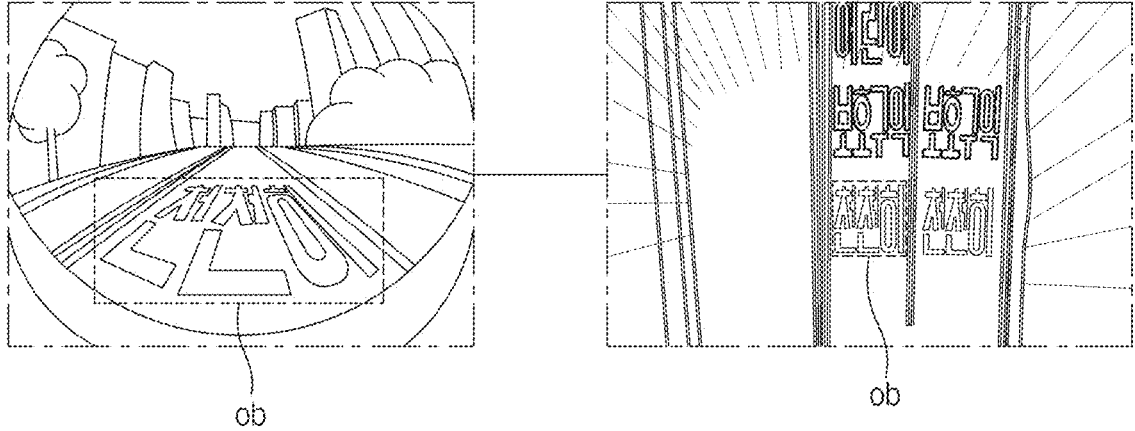
FIG. 4 is a view for illustrating a top view image.

FIG. 4 is a view for illustrating a top view image.

As shown in (a) in FIG. 4, in the fisheye view image, even in one object (ob), changes in a size and a shape of the object (ob) may be great depending on a recognition position. On the other hand, as in (b) in FIG. 4, the object (ob) in the top view image has little change in the size and the shape even when the recognition position is different. Thus, it may be advantageous for determining the object (ob) and estimating a position of the object (ob).

The object detecting device 110 may more accurately determine the size, the shape, and the position of the object by detecting the object in the top view image.

The object detecting device 110 may detect the object based on the AI described above.

The object detecting device 110 according to an embodiment may detect a road surface mark of a road as the object. For example, the object detecting device 110 may detect a type of line as the object based on a solid line, a dotted line, a diagonal line, a color, and the like. In addition, the object detecting device 110 may detect a road surface mark indicated in a text form such as "slow" and "stop" as the object. In addition, the object detecting device 110 may detect, as the object, a road surface mark for guiding a traveling direction of the vehicle in a lane.

The object detecting device 110 according to an embodiment of the present disclosure may set a bounding box of the detected object. The object tracking device 120 to be described below may determine a region inside the bounding box as the object.

In S320, the object tracking device 120 of the controller 100 may assign the ID to the detected object.

The controller 100 may assign the ID to the detected object.

The controller 100 may assign a new ID when the detected object is a new object.

Alternatively, the controller 100 may maintain the existing ID when the object is the estimated object that has been being tracked or an unrecognized object that has not been recognized.

The controller 100 may determine whether the detected object is the new object, the estimated object, or the unrecognized object based on comparison between a magnitude of the IOU and a threshold value.

Figure 5:
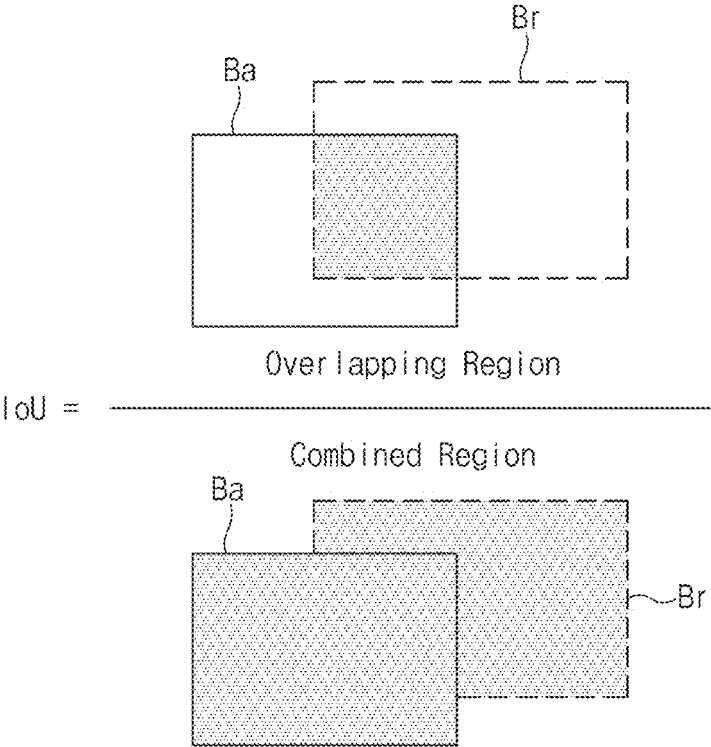
FIG. 5 is a view illustrating an intersection over union (IOU)

FIG. 5 is a view illustrating an intersection over union (IOU).

As shown in FIG. 5, the IOU may be calculated as a magnitude of an intersection region of a detected object Br and estimated objects Ba compared to a magnitude of total regions of the detected object Br and the estimated objects Ba. The detected object Br may mean an object detected in an image frame. In addition, the estimated object Ba may mean an object predicted based on the detected object detected in the previous frame. Therefore, the IOU value may provide a criterion for primarily determining an accuracy of the object estimation.

When magnitudes of the detected object Br and the estimated object Ba are the same, the IOU may become a value equal to or higher than 0.5 when $2/3$ or more of the two objects overlap each other. An embodiment of the present disclosure may set the threshold value as 0.5 and may determine whether the object is the new object, the estimated object, or the unrecognized object based on the threshold value.

Figure 6:
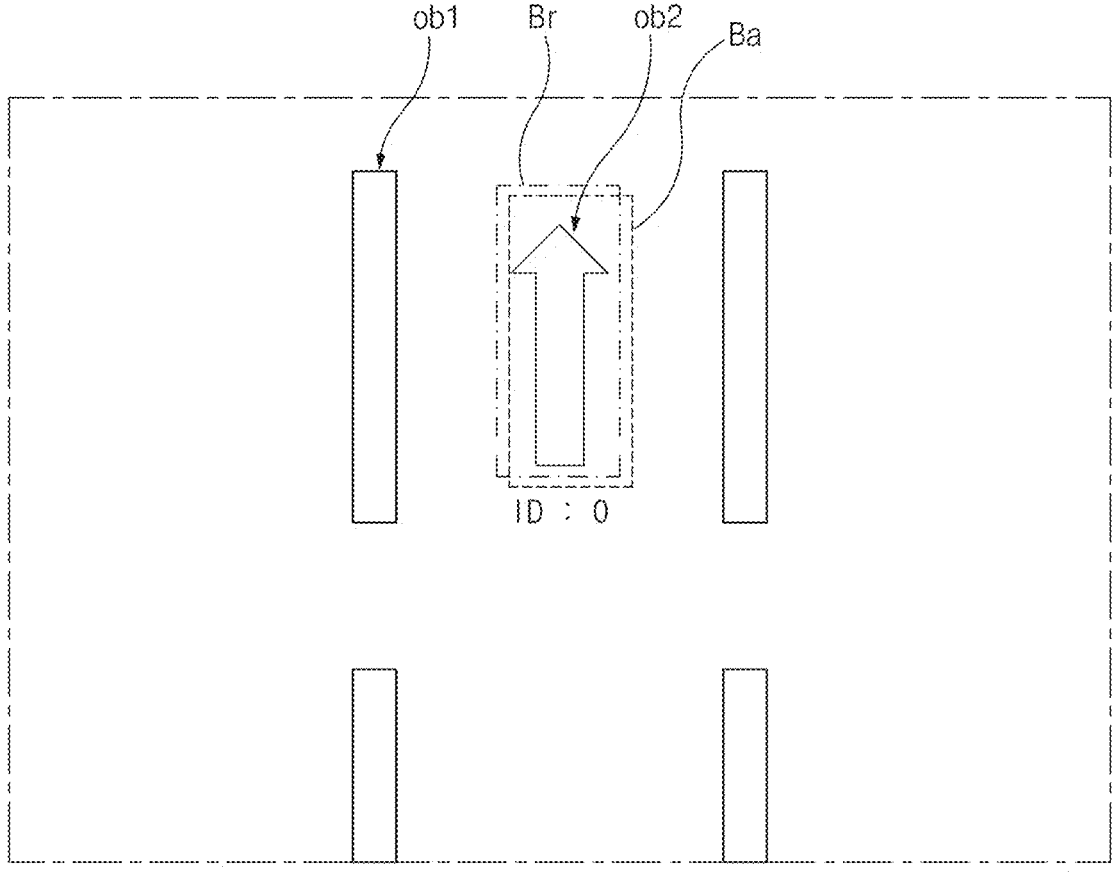
FIGS. 6-8 are views illustrating a method for assigning an ID of an object based on an IOU value.
Figure 7:
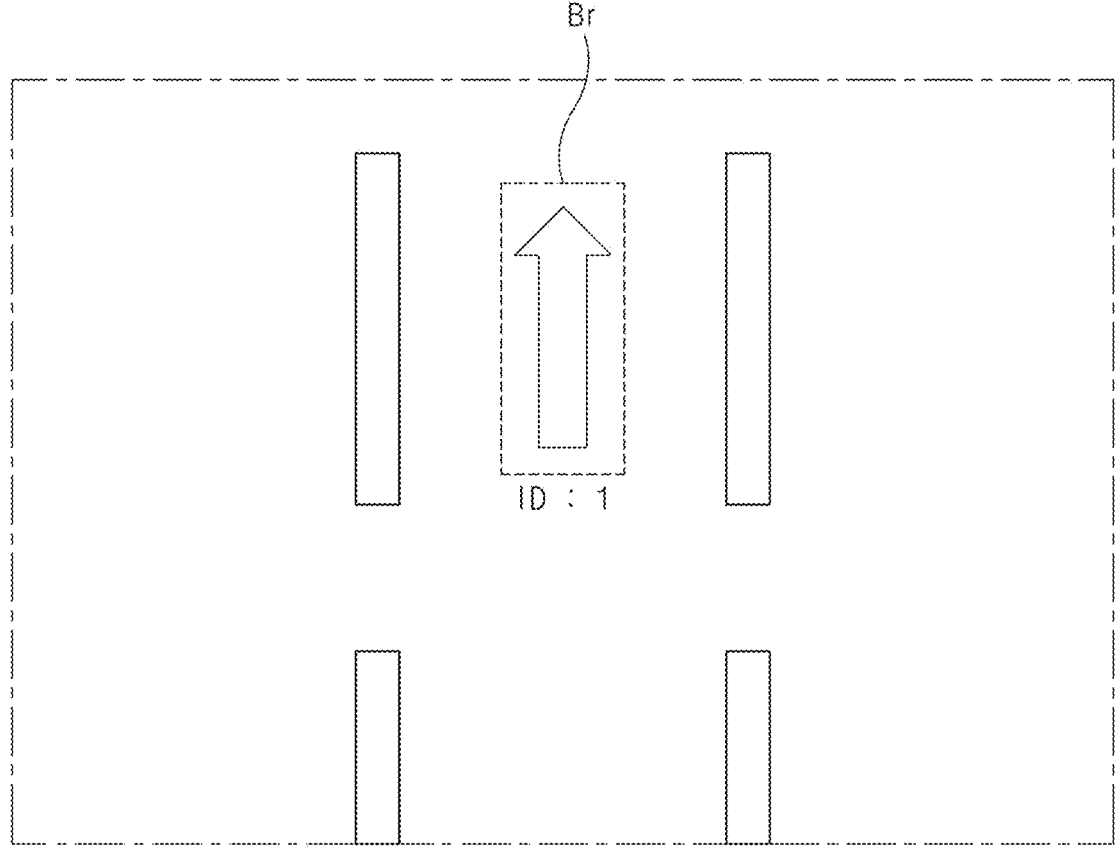
Figure 8:
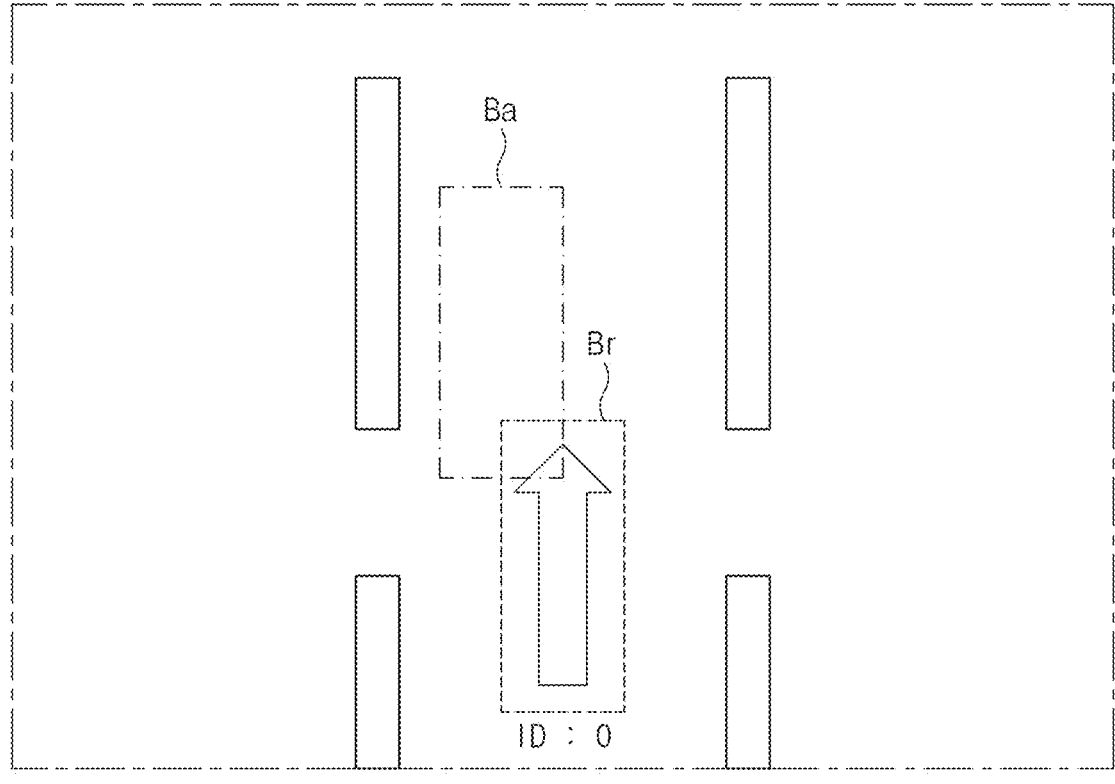

FIGS. 6-8 are views illustrating a method for assigning an ID of an object based on an IOU value.

Referring to FIGS. 6-8, the object detecting device 110 of the controller 100 may detect objects ob1 and ob2 in an image of an n-th frame (n is a natural number equal to or greater than 2). As shown in the drawings, the object detecting device 110 may detect the line ob1 and the traveling direction guiding mark ob2 as the objects.

FIG. 6 is a view illustrating a method for assigning an ID when an IOU between the detected object Br and the estimated object Ba in an image frame exceeds a threshold value.

As shown in FIG. 6, when the IOU between the detected object Br and the estimated object Ba in the image of the n-th frame exceeds the threshold value, the controller 100 may determine that the object in the n-th frame is the object being tracked.

When the detected object Br is determined as the estimated object Ba, the controller 100 may set an ID of the detected object Br to inherit an ID of the estimated object Ba. In other words, the ID of the detected object Br corresponding to 0 in FIG. 6 may inherit an ID of an object that is a target of the estimated object Ba in the previous frame.

FIGS. 7 and 8 are views illustrating a method for assigning an ID when an IOU between the detected object Br and the estimated object Ba in an image frame is equal to or lower than a threshold value.

As shown in FIGS. 7 and 8, when the IOU between the detected object Br and the estimated object Ba in the image frame is lower than the threshold value, the controller 100 may determine the detected object Br as the new object or the unrecognized object.

More specifically, as shown in FIG. 7, the detected object Br may be first detected in an arbitrary image frame. The controller 100 may determine objects whose IOU between the detected object Br and the estimated object is equal to or lower than the threshold value as the new objects. In other words, when the IOU between the detected object and the estimated object is 0, the controller 100 may determine the detected object Br as the new object.

When the detected object Br is determined as the new object, the controller 100 may assign a new ID to the detected object Br. In other words, as shown in FIG. 7, the object tracking device 120 may assign 1 corresponding to the new ID to the detected object Br.

Alternatively, as in FIG. 8, the detected object Br may not be the object initially detected in the arbitrary image frame but may have the IOU with the estimated object Ba equal to or lower than the threshold value. In other words, a case in which the IOU between the detected object Br and the estimated object Ba is equal to or lower than the threshold value and higher than 0 may occur. When the IOU between the detected object Br and the estimated object Ba is equal to or lower than the threshold value and higher than 0, the controller 100 may determine the corresponding objects as the unrecognized objects. In other words, the object detected as the unrecognized object in the arbitrary image frame may mean that the position estimation of the object in the corresponding image frame is not performed properly as the object tracking is inaccurate.

When the detected object Br is not determined as the estimated object, but is not the newly appeared new object, the controller 100 may set the ID of the detected object Br to inherit the ID of the estimated object Ba. In other words, the controller 100 may allow the detected object Br to inherit 0 corresponding to the ID of the object that is the target of the estimated object Ba.

In S330, the object tracking device 120 of the controller 100 may assign the weight to each of the IDs based on the number of times of each of the IDs.

Figure 9:
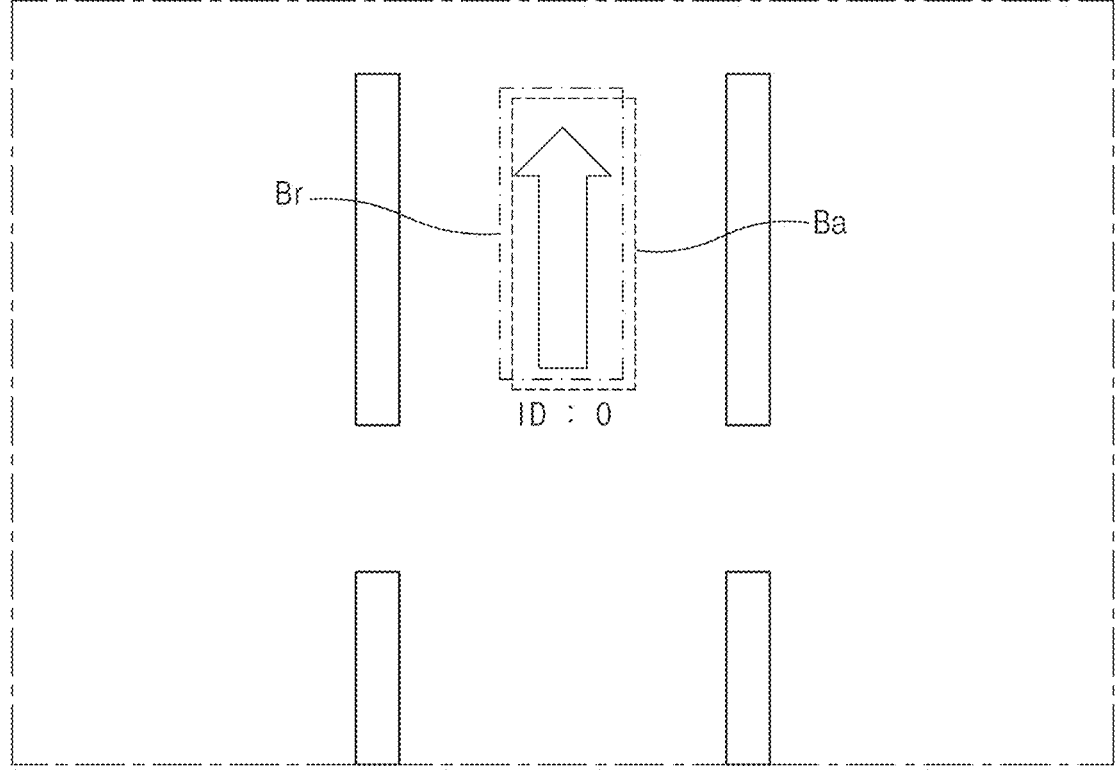
FIGS. 9-11 are views illustrating an embodiment in which a processor assigns a weight to each of IDs.
Figure 10:
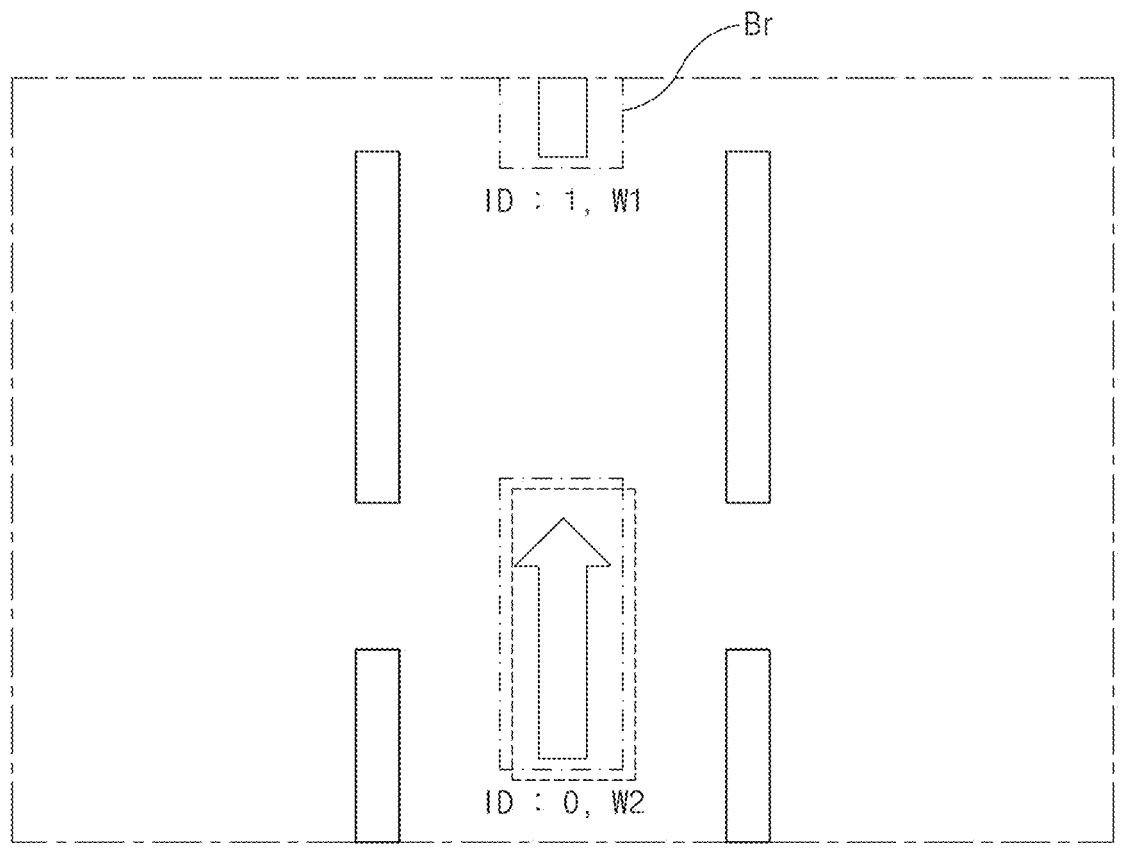
Figure 11:
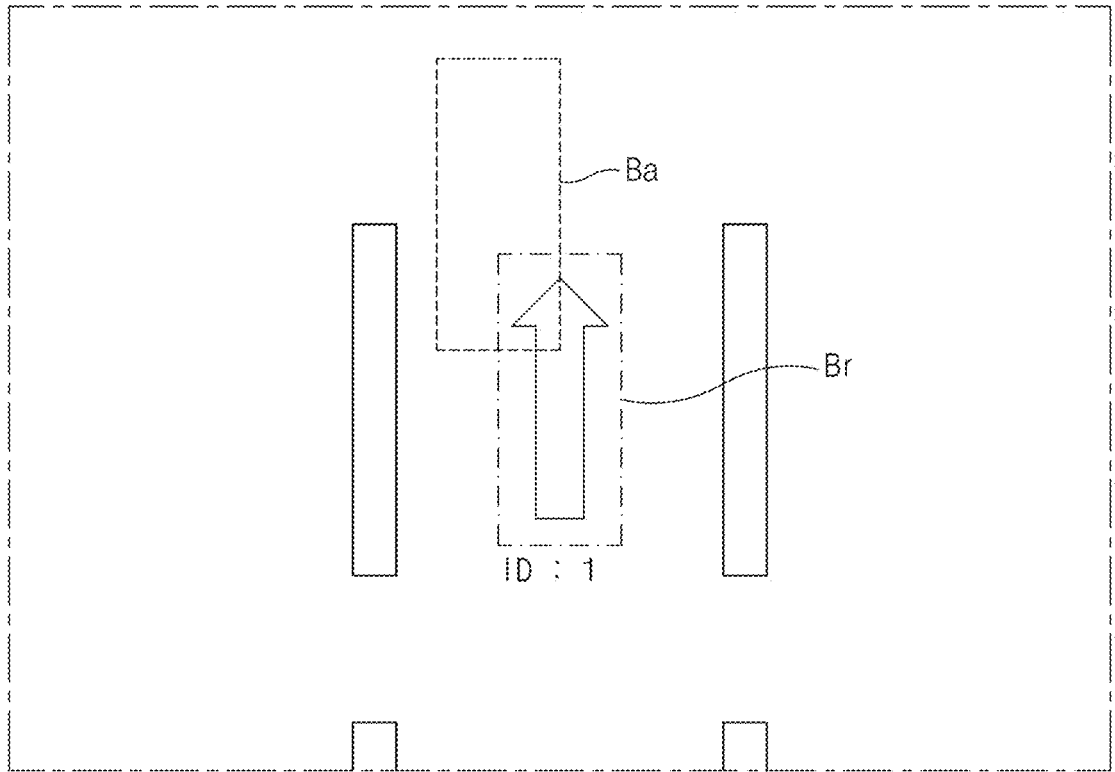

FIGS. 9-11 are views illustrating an embodiment in which a processor assigns a weight to each of IDs. In order to assign the weight, the controller 100 may calculate the IOU between the detected object Br and the estimated object Ba.

FIG. 9 is a view illustrating an example in which an IOU between the detected object Br and the estimated object Ba in an image frame exceeds a threshold value.

Referring to FIG. 9, when the IOU between the detected object Br and the estimated object Ba in the image frame exceeds the threshold value, the controller 100 may increase a weight for the detected object Br. In other words, the object tracking device 120 may increase the weight of the detected object Br determined as a tracked object from W1 to W2.

The weight may be increased or decreased to a preset magnitude, and, for example, may be increased or decreased by a magnitude of 1.

FIGS. 10 and 11 are views illustrating an example in which an IOU between the detected object Br and the estimated object Ba in an image frame is equal to or lower than a threshold value.

Referring to FIG. 10, the controller 100 may assign the weight to the new object. When the IOU between the detected object Br and the estimated object is 0, the controller 100 may assign the weight while determining the detected object Br as the new object. The detected object Br determined as the new object may be initially assigned with the weight. In other words, the object tracking device 120 may assign an initial weight of W1 to the new object.

Referring to FIG. 11, the controller 100 may reduce a weight for the unrecognized object.

In other words, when the IOU between the detected object Br and the estimated object Ba is equal to or lower than the threshold value and higher than 0, the controller 100 may reduce the weight of the corresponding detected object Br. For example, when an object having the weight of W2 in a (n−1)-th image frame is determined as the unrecognized object in the n-th frame, the controller 100 may decrease the weight of the corresponding object to W1.

The object tracking method shown in FIG. 3 may further include a procedure of calculating a quality index (QI).

According to an embodiment of the present disclosure, the controller 100 may calculate the quality index based on the weight and a detected region of the detected object. The detected region of the detected object may be selected based on a size of an overlapping region of the detected object and a region of interest (hereinafter, ROI). The quality index may be an item for evaluating reliability of the procedure of generating, by the object tracking device 120, the estimated object.

The increase in the weight of the detected object may mean that the object tracking was accurately performed in the image frame. Therefore, the controller 100 according to an embodiment may increase the quality index based on the increase in the weight of the detected object.

In addition, the decrease in the weight of the detected object may mean that the accuracy of the object tracking in the image frame is low. Therefore, the controller 100 according to an embodiment may lower the quality index when the weight of the detected object is reduced.

An embodiment for calculating the quality index is as follows.

Figure 12:
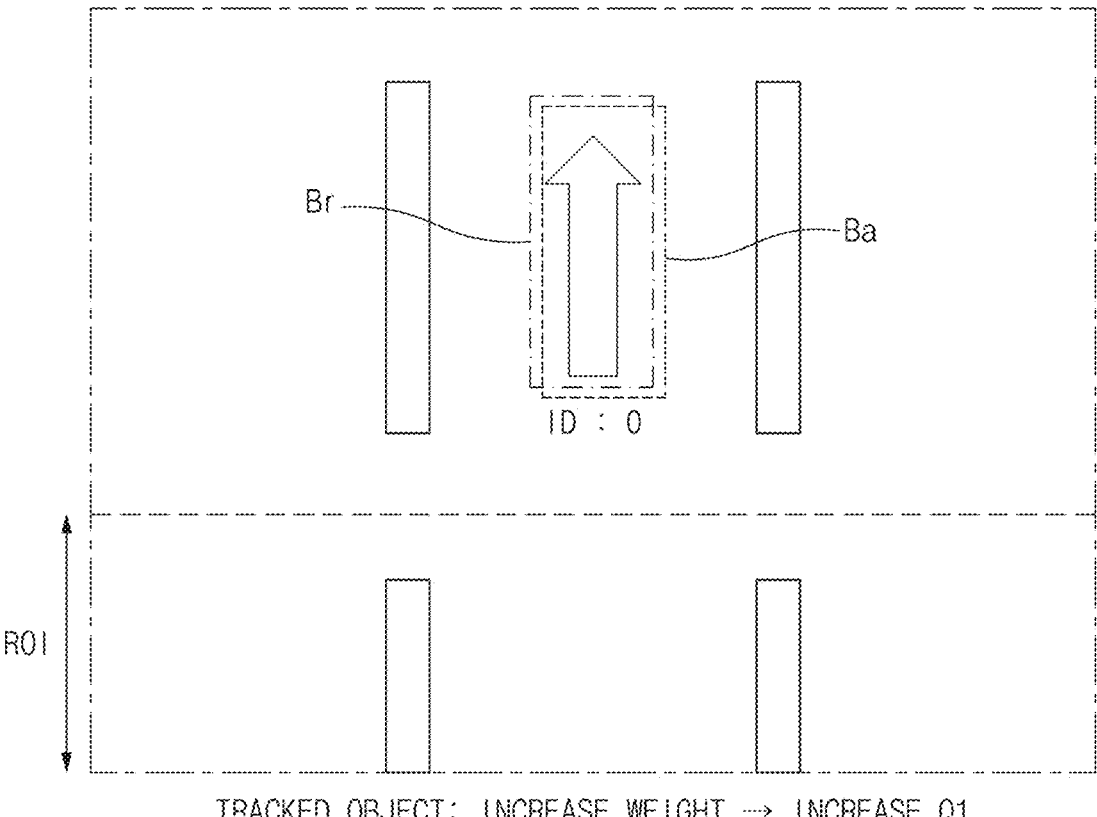
FIGS. 12-14 are views illustrating a method for calculating a quality index according to an embodiment of the present disclosure.
Figure 13:
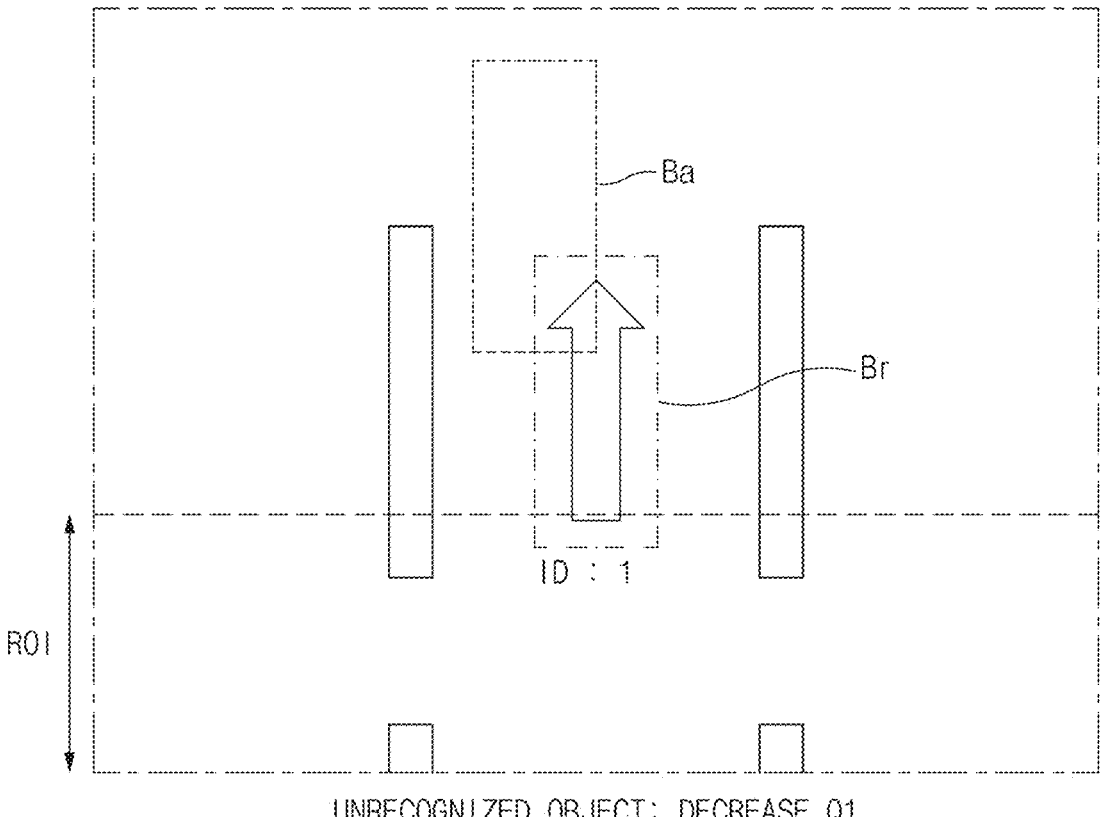
Figure 14:
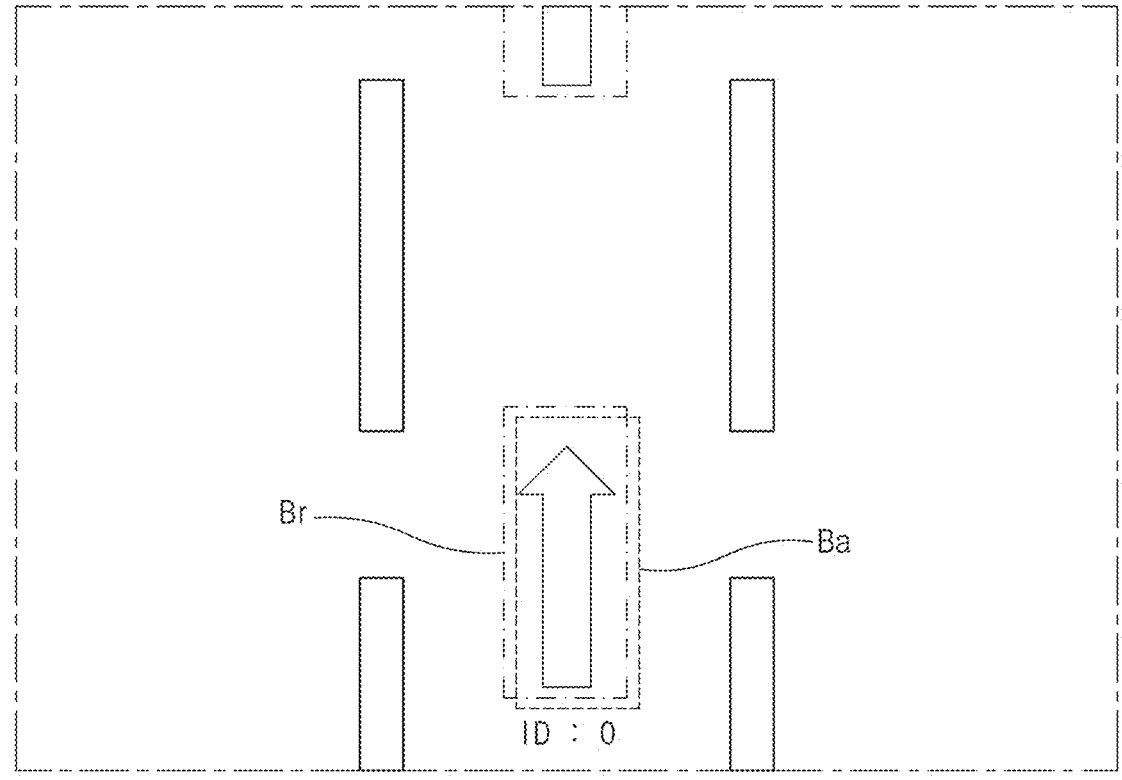

FIGS. 12-14 are views illustrating a method for calculating a quality index according to an embodiment of the present disclosure.

FIG. 12 is a view illustrating a case in which a detected object is located out of a region of interest in a state in which a weight of the detected object is increased.

Referring to FIG. 12, the controller 100 may increase a quality index of a detection algorithm based on the increase in the weight of the detected object Br. In other words, based on the fact that the IOU between the detected object Br and the estimated object Ba exceeds the threshold value, the controller 100 may increase the quality index of the detection algorithm.

In addition, the controller 100 may reduce the quality index of the detection algorithm based on the fact that the detected object is detected out of the region of interest.

FIG. 13 is a view illustrating a state in which a weight of a detected object is reduced.

Referring to FIG. 13, the controller 100 may reduce the quality index when the detected object Br is the unrecognized object. In other words, when the IOU between the detected object Br and the estimated object Ba is equal to or lower than the threshold value and the detected object Br is not the new object, the controller 100 may reduce the quality index of the detection algorithm.

FIG. 14 is a view illustrating a case in which a detected object is in a region of interest in a state in which a weight of the detected object is increased.

Referring to FIG. 14, the controller 100 may increase the quality index of the detection algorithm based on the increase in the weight of the detected object Br. In other words, based on the fact that the IOU between the detected object Br and the estimated object Ba is equal to or higher than the threshold value, the controller 100 may increase the quality index of the detection algorithm.

In addition, the controller 100 may reduce the quality index of the detection algorithm based on that the detected object Br is detected in the region of interest. The controller 100 may determine that the detected object Br is located in the region of interest based on the fact that the overlapping region of the detected object Br and the region of interest is equal to or greater than a certain region.

In addition, the controller 100 may evaluate reliability of the object tracking method according to an embodiment of the present disclosure based on the quality index.

In addition, the object tracking method according to an embodiment of the present disclosure shown in FIG. 3 may further include a procedure for estimating the next position.

The controller 100 may estimate the position of the object based on a vehicle speed and a frame rate of the image. The controller 100 may receive speed information of the vehicle in a CAN communication scheme. Herein, the frame rate of the image may mean a transmission speed of the image frame transmitted from the camera 11 to the controller 100. When all images filmed by the camera 11 are transmitted to the controller 100, the frame rate of the image may be a filming speed of the camera 11. For example, when the frame rate is 60 Hz, the controller 100 may receive 60 image frames for each second.

According to an embodiment, the controller 100 may calculate a transmission interval between consecutive image frames based on the frame rate. For example, when the frame rate is 60 Hz, the transmission interval between the consecutive image frames may be ¹⁄₆₀ (second).

The controller 100 may calculate a moved distance of the object in units of the transmission interval between the image frames based on the speed of the vehicle.

In addition, the controller 100 may indicate the estimated object based on the calculated moved distance. In the procedure of indicating the estimated object, the controller 100 may consider the traveling direction of the vehicle.

Figure 15:
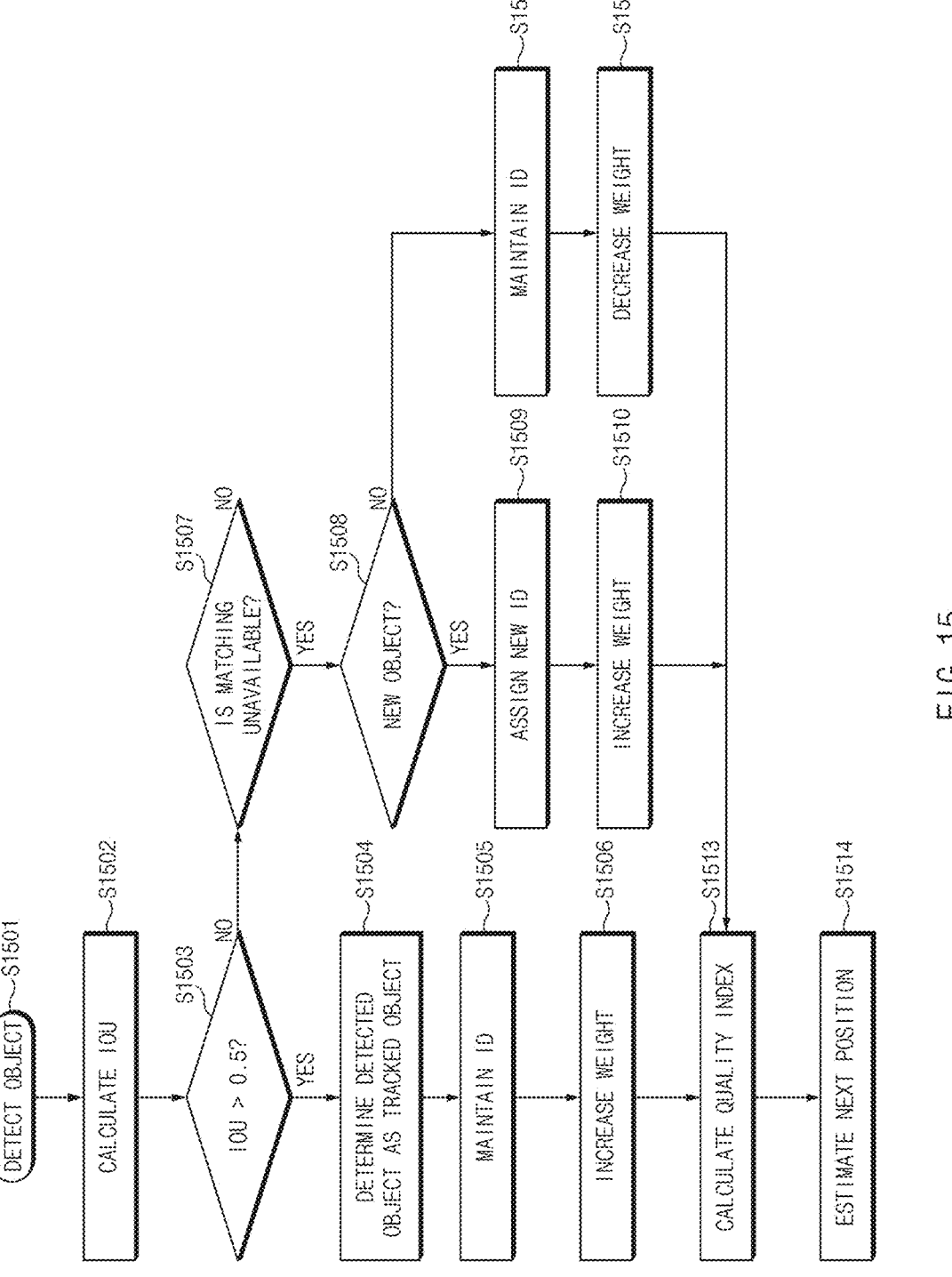
FIG. 15 is a flowchart for illustrating a vehicle control method according to another embodiment of the present disclosure.

Hereinafter, a vehicle control method according to another embodiment of the present disclosure is described in detail with reference to FIG. 15. FIG. 15 is a flowchart for illustrating a vehicle control method according to another embodiment of the present disclosure. A procedure shown in FIG. may be performed by the controller 100 shown in FIG. 2.

In S1501, the object detecting device 110 of the controller 100 may detect the object in the image frame.

The image frame may be the image acquired by the camera 11 of the vehicle. The controller 100 according to an embodiment of the present disclosure may convert the image acquired by the camera 11 into an image frame of the top view form as shown in FIG. 4 and detect the object from the image frame of the top view form.

The object may be a building around the road, a vehicle traveling on the road, or a moving object around the road.

Alternatively, the object may be a road facility such as a traffic light or a guide sign for guiding travel to the vehicle drivers.

Alternatively, the object may be the road surface mark for the line of the road or guiding the line.

In S1502, the object tracking device 120 of the controller 100 may calculate the IOU between the detected object and the estimated object.

The detected object may be the object detected by the object detecting device 110 in the image frame. The estimated object may be the object predicted based on detected object detected in the previous image frame.

In S1503, the object tracking device 120 may compare the IOU value of the detected object and the estimated object with the threshold value. The threshold value may be set at a level at which reliability of the estimated object may be recognized. According to an embodiment, the threshold value may be set to 0.5.

In S1504, based on the fact that the IOU between the detected object and the estimated object exceeds the threshold value (YES in S1503), the object tracking device 120 may determine the detected object as the tracked object. The tracked object as the detected object acquired from the previous image frame may mean the object that is the target of the detected object.

In S1505, the controller 100 may maintain the ID of the detected object determined as the tracked object. When the detected object is determined as the tracked object, it may be considered that the tracking process of the detected object is proceeding smoothly. Therefore, when the IOU between the detected object and the estimated object exceeds the threshold value, the controller 100 may allow the ID of the detected object to inherit the ID of the object that is the tracking target.

In S1506, the controller 100 may increase the weight for the detected object determined as the tracked object. When the detected object is determined as the tracked object, it may be considered that the tracking process of the detected object is proceeding smoothly. Therefore, when the IOU between the detected object and the estimated object exceeds the threshold value, the controller 100 may assign the weight of the object that is the tracking target.

When the IOU value of the detected object and the estimated object is equal to or lower than the threshold value based on the result of comparing the IOU value of the detected object and the estimated object with the threshold value in S1503 (NO in S1503), the controller 100 may determine whether the detected object is the new object via procedures 51507 and S1508.

The controller 100 may determine the detected object whose IOU value is calculated as 0 as the new object.

In S1509, when the detected object is the new object (YES in S1508), the controller 100 may assign the new ID to the detected object.

In addition, in 51510, when the detected object is the new object (YES in S1508), the controller 100 may assign the weight to the new object. In other words, in an image frame in which the detected object is determined as the new object, the new object may be assigned with the initial weight.

In S1511, when the detected object is not the new object (NO in S1508), the controller 100 may maintain the ID of the detected object. The detected object in operation S1511 may mean the object that is neither the tracked object nor the new object. Even when the detected object in operation S1511 is not determined as the tracked object that is smoothly being tracked, because the detected object corresponds to an object that has been being tracked from the previous image frame, the existing ID may be inherited.

In S1512, when the detected object is not the new object (NO in S1508), the controller 100 may reduce the weight while maintaining the ID of the object. The case in which the detected object that does not correspond to the new object is not determined as the tracked object may mean that reliability of the tracking algorithm for the object is low. Therefore, the controller 100 may reduce the weight of the unrecognized object that is the detected object determined not to be the tracked object and determined not to be the new object.

In S1513, the controller 100 may determine the quality index based on the weight assigned to each of the IDs. The weight may be increased or decreased by being accumulated in the successive image frames.

The controller 100 may calculate the quality index for each image frame. Alternatively, the controller 100 may calculate the quality index of the image frame in units of a certain time.

According to an embodiment, the controller 100 may calculate the quality index of the image frame in proportion to the weight.

Further, according to an embodiment, when the overlapping portion between the detected object and the ROI region is equal to or greater than a critical region, the controller 100 may maintain the quality index of the detected object. Alternatively, when the overlapping portion between the detected object and the ROI region is smaller than the critical region, the controller 100 may reduce the quality index of the detected object.

In S1514, the controller 100 may estimate the next position of the detected object based on the travel speed of the vehicle and the transmission interval of the image data acquired by an image receiver.

Figure 16:
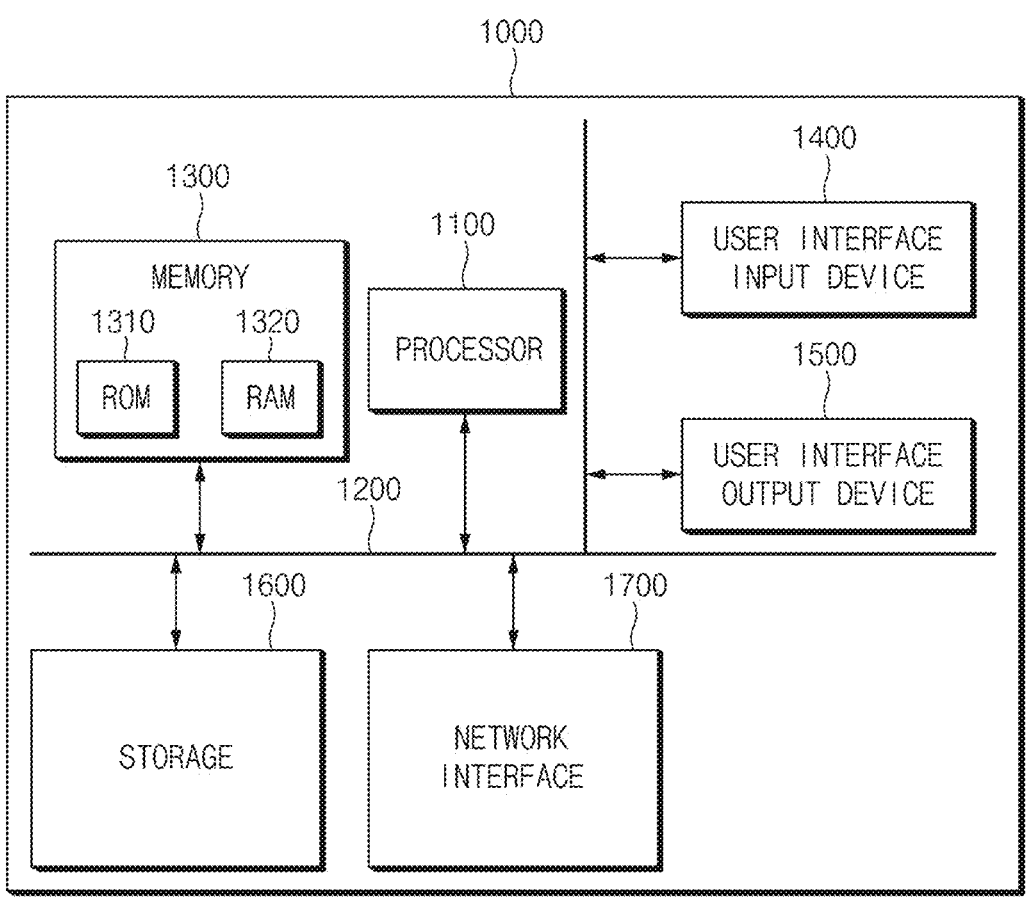
FIG. 16 is a view illustrating a computing system according to an embodiment of the present disclosure.

FIG. 16 is a view illustrating a computing system according to an embodiment of the present disclosure.

With reference to FIG. 16, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The processor 1100 shown in FIG. 16 may include the controller 100 shown in FIG. 2. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware, a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM.

The storage medium is coupled to the processor 1100, which may read information from and write information to the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure. Various modifications and changes may be made by those having ordinary skill in the art without departing from the essential characteristics of the present disclosure.

Therefore, the embodiments disclosed in the present disclosure are not intended to limit the technical idea of the present disclosure but to illustrate the present disclosure. The scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to an embodiment of the present disclosure, the performance of tracking the object may be improved by varying the weight based on a rate at which the object is recognized.

According to an embodiment of the present disclosure, a performance of the object tracking algorithm may be guaranteed by calculating the quality index based on the weight of the object.

In addition, various effects directly or indirectly identified through this document may be provided.

Hereinabove, although the present disclosure has been described with reference to embodiments and the accompanying drawings, the present disclosure is not limited thereto. The embodiments of the present disclosure may be variously modified and altered by those having ordinary skill in the art to which the present disclosure pertains without departing from the spirit and scope of the present disclosure claimed in the following claims.

What is claimed is:

1. A device for tracking an object, the device comprising:
   a camera for acquiring an external environment image of a vehicle; and
   a controller configured to:
   extract a detected object from the external environment image,
   generate an estimated object by predicting a next position of the detected object,
   assign an ID to the detected object based on an intersection over union (IOU) between the estimated object and the detected object, assign a weight based on a number of times of each of the IDs, generate the estimated object based on the weight, and increase the weight as the number of times of the IDs increases, wherein generating the estimated object further comprises calculating a quality index based on the weight, and wherein the controller is further configured to:

increase the quality index based on that a first weight assigned in a (n–k)-th image frame is greater than a second weight assigned in a n-th image frame, wherein the n is a natural number, k is a natural number less than the n.

2. The device of claim 1, wherein the controller is configured to:

acquire a front image of the vehicle as the external environment image; and convert the front image into a top view image.

3. The device of claim 1, wherein the controller is configured to:

classify the detected object as a tracked object based on the IOU exceeding a preset threshold value; and assign the ID to the tracked object to inherit an ID of a tracking target object.

4. The device of claim 3, wherein the controller is configured to increase the weight for the tracked object.

5. The device of claim 1, wherein the controller is configured to:

classify the detected object as a new object based on the IOU higher than 0 and equal to or lower than a preset threshold value; and assign a new ID to the new object.

6. The device of claim 5, wherein the controller is configured to increase the weight for the new object.

7. The device of claim 1, wherein the controller is configured to:

classify the detected object as an unrecognized object based on the IOU being 0; and assign the ID to the unrecognized object to inherit an ID of a tracking target object.

8. The device of claim 1, wherein the controller is configured to calculate the quality index based on a detected position of the detected object.

9. The device of claim 8, wherein the controller is configured to reduce the quality index based on that the detected object is out of a region of interest.

10. A method for tracking an object, the method comprising:

extracting a detected object from an external environment image;

generating an estimated object by predicting a next position of the detected object;

assigning an ID to the detected object based on an intersection over union (IOU) between the estimated object and the detected object;

assigning a weight based on a number of times of each of the IDs;

generating the estimated object based on the weight; and increasing the weight as the number of times of the IDs increases, wherein generating the estimated object further comprises calculating a quality index based on the weight, and wherein the method further comprises increasing the quality index based on that a first weight assigned in a (n–k)-th image frame is greater than a second weight assigned in a n-th image frame, wherein the n is a natural number, k is a natural number less than the n.

11. The method of claim 10, wherein the extracting of the detected object includes:

acquiring a front image of a vehicle as the external environment image;

converting the front image into a top view image; and extracting the detected object from the top view image.

12. The method of claim 10, wherein the assigning of the ID to the detected object includes:

classifying the detected object as a tracked object based on the IOU exceeding a preset threshold value; and assigning the ID to the tracked object to inherit an ID of a tracking target object.

13. The method of claim 12, wherein the assigning of the weight includes increasing the weight for the tracked object.

14. The method of claim 10, wherein the assigning of the ID to the detected object includes:

classifying the detected object as a new object based on the IOU higher than 0 and equal to or lower than a preset threshold value; and assigning a new ID to the new object.

15. The method of claim 14, wherein the assigning of the weight includes increasing the weight for the new object.

16. The method of claim 10, wherein the assigning of the ID to the detected object includes:

classifying the detected object as an unrecognized object based on the IOU being 0; and assigning the ID to the unrecognized object to inherit an ID of a tracking target object.

17. The method of claim 10, further comprising:

calculating the quality index based on a detected position of the detected object.

18. The method of claim 17, wherein the calculating of the quality index includes reducing the quality index based on that the detected object is out of a region of interest.

* * * * *